US008778541B2

(12) United States Patent
Yamamoto et al.

(10) Patent No.: US 8,778,541 B2
(45) Date of Patent: Jul. 15, 2014

(54) NEGATIVE ELECTRODE FOR NONAQUEOUS ELECTROLYTE SOLUTION BATTERY AND NONAQUEOUS ELECTROLYTE SOLUTION BATTERY HAVING THE SAME

(75) Inventors: Kouhei Yamamoto, Inazawa (JP); Norikazu Adachi, Nagoya (JP); Hisashi Umemoto, Chiryu (JP); Manabu Yamada, Okazaki (JP); Yasuyuki Ooba, Gamagori (JP); Nobuyuki Nishi, Okazaki (JP); Shigenori Numao, Okazaki (JP)

(73) Assignees: Denso Corporation, Kariya (JP); Inter-University Research Institute Corporation National Institutes of Natural Sciences, Tokyo (JP)

( * ) Notice: Subject to any disclaimer, the term of this patent is extended or adjusted under 35 U.S.C. 154(b) by 476 days.

(21) Appl. No.: 12/799,580

(22) Filed: Apr. 27, 2010

(65) Prior Publication Data

US 2010/0316907 A1 Dec. 16, 2010

(30) Foreign Application Priority Data

Apr. 28, 2009 (JP) .................................. 2009-109857
Mar. 26, 2010 (JP) .................................. 2010-072572

(51) Int. Cl.
*H01M 4/00* (2006.01)
*H01M 4/02* (2006.01)
*H01M 4/133* (2010.01)
*H01M 4/64* (2006.01)
*H01M 4/66* (2006.01)
*H01M 4/72* (2006.01)
*H01M 4/78* (2006.01)
*H01M 4/88* (2006.01)
*H01M 4/96* (2006.01)

(52) U.S. Cl.
USPC ............ 429/236; 429/209; 429/233; 429/245

(58) Field of Classification Search
USPC .......................... 429/219, 225, 226, 228, 231
See application file for complete search history.

(56) References Cited

U.S. PATENT DOCUMENTS 4,663,256 A * 5/1987 Corrigan ....................... 429/223
2006/0068292 A1 3/2006 Mizutani et al.

(Continued)

FOREIGN PATENT DOCUMENTS

JP 04-039864 2/1992
JP 07-029602 1/1995

(Continued)

OTHER PUBLICATIONS

Office Action issued Jun. 4, 2012 in corresponding Chinese Application No. 201010171577.0 with English translation.

(Continued)

*Primary Examiner* — Basia Ridley
*Assistant Examiner* — Caitlin Wilmot
(74) *Attorney, Agent, or Firm* — Harness, Dickey & Pierce, PLC (57) ABSTRACT

A negative electrode used for a nonaqueous electrolyte solution battery having nonaqueous electrolyte solution containing lithium ion includes a metal carbon composite material. The metal carbon composite material has a porous carbon material having cavities, and a metal material made of metal to reversibly store or emit lithium ion. The metal material is arranged on a surface of the porous carbon material including inner surfaces of the cavities. The porous carbon material has a mass of 1-65 mass % when the metal carbon composite material is defined to have a mass of 100 mass %.

9 Claims, 7 Drawing Sheets

(56) References Cited

U.S. PATENT DOCUMENTS

| | | | |
|---|---|---|---|
| 2008/0096110 A1 | 4/2008 | Bito et al. | |
| 2008/0145757 A1* | 6/2008 | Mah et al. | 429/219 |
| 2008/0160409 A1 | 7/2008 | Ishida et al. | |
| 2008/0237536 A1 | 10/2008 | Sano | |
| 2009/0004564 A1 | 1/2009 | Ishida et al. | |
| 2009/0305131 A1* | 12/2009 | Kumar et al. | 429/206 |
| 2010/0230298 A1* | 9/2010 | Biener et al. | 205/799 |

FOREIGN PATENT DOCUMENTS

| | | |
|---|---|---|
| JP | 2002-093416 | 3/2002 |
| JP | 2002-293521 | 10/2002 |
| JP | 2003-100284 | 4/2003 |
| JP | 2004-220910 | 8/2004 |
| JP | 2004-259475 | 9/2004 |
| JP | 2004-265718 | 9/2004 |
| JP | 2005-158305 | 6/2005 |
| JP | 2006-260886 | 9/2006 |
| JP | 2009-272041 | 11/2009 |

OTHER PUBLICATIONS

Office action dated Jan. 19, 2012 in corresponding Korean Application No. 10-2010-0038474 with English translation.

Carbon 47 (2009) pp. 306-312, Numao, et al. "Synthesis and characterization of mesoporous carbon nano-dendrites with graphitic ultra-thin walls and their application to super capacitor electrodes."

Office action dated Mar. 11, 2013 in corresponding Chinese Application No. 2010 10171577.0 with English translation.

Office action dated Jan. 13, 2014 in corresponding Chinese Application No. 2010 10171577.0.

Office action dated Sep. 18, 2013 in corresponding Chinese Application No. 2010 10171577.0 with English translation.

Office Action dated Nov. 19, 2013 in corresponding Japanese Application No. 2010-072572.

\* cited by examiner

| METAL KIND | MELTING POINT (°C) |
|---|---|
| Si | 1414 |
| Al | 660 |
| Cr | 1907 |
| Fe | 1535 |
| Mn | 1246 |
| Ni | 1455 |
| Sn | 449 |
| Co | 1495 |
| Ti | 1668 |
| V | 3456 |
| In | 157 |
| Sb | 631 |
| Ge | 938 |
| Cu | 1084 |
| Ag | 962 |

FIG. 7

| | METAL MATERIAL KIND | RATIO OF POROUS CARBON MATERIAL (mass %) | POROUS CARBON MATERIAL | | | | SYNTHESIS METHOD | INITIAL DISCHARGE CAPACITY (mAh/g) | INITIAL IRREVERSIBLE CAPACITY (mAh/g) | CAPACITY MAINTAIN RATE (%) |
|---|---|---|---|---|---|---|---|---|---|---|
| | | | KIND | TAP DENSITY (g/cc) | ENTIRE PORE VOLUME (cc/g) | AVERAGE PORE DIAMETER (nm) | | | | |
| EMBOD. 1 | $Sn-SnO_x$ | 2 | MCND | 0.12 | 1.84 | 4.1 | LIQUID | 807 | 3600 | 91 |
| EMBOD. 2 | $Sn-SnO_x$ | 1 | MCND | 0.12 | 1.84 | 4.1 | LIQUID | 848 | 3650 | 86 |
| EMBOD. 3 | $Sn-SnO_x$ | 10 | MCND | 0.12 | 1.84 | 4.1 | LIQUID | 770 | 3500 | 90 |
| EMBOD. 4 | $Sn-SnO_x$ | 2 | GLC-P | 0.12 | 1.65 | 5.1 | LIQUID | 789 | 3750 | 84 |
| EMBOD. 5 | $Sn-SnO_x$ | 2 | GLC-H-P | 0.2 | 2.13 | 7.0 | LIQUID | 800 | 3450 | 86 |
| EMBOD. 6 | $Sn-SnO_x$ | 2 | SA1000 (CLEANED) | 0.15 | 1.56 | 4.2 | LIQUID | 698 | 3700 | 85 |
| EMBOD. 7 | $Sn, SnO_2, Sn_2O_3$ | 63.1 | MCND | 0.12 | 1.84 | 4.1 | GAS | 827 | 4091 | 95 |
| EMBOD. 8 | $Sn$ | 34.3 | MCND | 0.12 | 1.84 | 4.1 | GAS | 533 | 1694 | 100 |
| EMBOD. 9 | $Sn, SnO_2$ | 9 | MCND | 0.12 | 1.84 | 4.1 | SOLID | 900 | 1680 | 83 |
| EMBOD. 10 | $Si, SiO_2$ | 50 | MCND | 0.12 | 1.84 | 4.1 | SOLID | 1300 | 2500 | 80 |
| EMBOD. 11 | $Cu_6Sn_5, Cu_3Sn$ | 9 | MCND | 0.12 | 1.84 | 4.1 | SOLID | 382 | 1800 | 93 |
| EMBOD. 12 | $Ag_3Sn$ | 10 | MCND | 0.12 | 1.84 | 4.1 | SOLID | 350 | 1950 | 90 |
| EMBOD. 13 | $SnAgSb$ | 10 | MCND | 0.12 | 1.84 | 4.1 | SOLID | 450 | 1800 | 95 |
| EMBOD. 14 | $Ag_3Ge$ | 10 | MCND | 0.12 | 1.84 | 4.1 | SOLID | 468 | 1700 | 87 |
| EMBOD. 15 | $Cu_5Ge_2$ | 10 | MCND | 0.12 | 1.84 | 4.1 | SOLID | 270 | 1670 | 90 |
| COMPAR. 1 | $Sn$ | — | — | — | — | — | — | 377 | 400 | 1 (AFTER 5cyc) |

NEGATIVE ELECTRODE FOR NONAQUEOUS ELECTROLYTE SOLUTION BATTERY AND NONAQUEOUS ELECTROLYTE SOLUTION BATTERY HAVING THE SAME

CROSS REFERENCE TO RELATED APPLICATION

This application is based on Japanese Patent Application No. 2009-109857 filed on Apr. 28, 2009, and Japanese Patent Application No. 2010-72572 filed on Mar. 26, 2010, the disclosures of which are incorporated herein by reference in their entirety.

BACKGROUND OF THE INVENTION

The present invention relates to a negative electrode used for a nonaqueous electrolyte solution battery having excellent charge-and-discharge cycle characteristic, and a nonaqueous electrolyte solution battery having the negative electrode.

In recent years, a cordless electrical equipment such as a video camera or portable telephone has a remarkable development. As a power source of the cordless electrical equipment, a lithium secondary battery having a high battery voltage and a high energy density attracts attention. As a material for activating a negative electrode of the lithium secondary battery, a carbon material able to store or emit lithium such as hard-to-graphitized carbon or graphite is used, because of a comparatively high capacity and good cycle characteristic.

However, the active material is required to have a further higher capacity, because the electrical equipment is further required to be small and to be used for a long time.

JP-A-07-29602 discloses a negative electrode active material such as lithium metal or lithium alloy so as to make a lithium secondary battery to have a higher capacity. Moreover, in recent years, simple metal such as Si, Sn or Al, or its alloy is proposed as the negative electrode active material.

However, a metal material such as Si or Sn has a large volume change in an alloying reaction with lithium, at a time of charging and discharging. In this case, the active material may have a crack or sliding. If an electric conduction route of the active material is lost by the crack or sliding, a cycle life for charging and discharging becomes short.

JP-A-2006-260886 discloses a solution for this disadvantage. In JP-A-2006-260886, alloy or metal to be alloyed with lithium has porous structure. The porous structure is produced by depositing polymer particles such as polystyrene or PMMA, by plating metal to be alloyed with lithium to the deposited particles, and by eliminating the particles. By this method, volume expansion generated in a charging time can be absorbed since many uniform communication apertures are formed. However, electrode itself becomes weak by the porous structure, and the weakness is shown in an embodiment of JP-A-2006-260886, in which the electrode is evaluated in a glass cell without forming a battery.

JP-A-2004-220910 discloses a mixture of carbon nano-fiber having aspect ratio of 10 or more and a metal-based active material to be alloyed with lithium. In this case, particles of the active material can be connected with each other. Therefore, a sliding of the active material and an exfoliation of electrode can be prevented, even if a volume change is generated in a charging and discharging time. In this case, since the carbon nano-fiber is twisted around the metal-based active material, electric conduction route can be secured. However, the negative electrode active material has a substantial volume change in a charging and discharging time, as shown in a cross-sectional view of JP-A-2004-220910 illustrating a volume expansion of an inorganic particle (negative electrode active material) when the inorganic particle is added into a carbon material. Therefore, the crack or the sliding of the active material is similarly generated even if a carbon material having fibrous or particle state is located around the metal-based active material having several-μm level. Although a remarkable difference (effect) can be seen if a period is short such as ten cycles, it is difficult to withstand charging and discharging cycles over a long period.

Further, JP-A-2007-335283 discloses a conducting material having a diameter smaller than an average pore diameter of a porous conductive material, made of the metal-based active material to store or emit lithium. A metal mesh having several or tens μm-mesh, or a nonwoven fabric or felt made of carbon material is used as a mold of the porous material. That is, a material disclosed in JP-A-2004-220910 is also suggested by JP-A-2007-335283. In this case, an effect of holding the whole electrode can be expected other than the effect shown in JP-A-2006-260886. However, similarly to JP-A-2004-220910, the crack or the sliding of the active material is similarly generated even if a carbon material having fibrous or particle state is located around the metal-based active material having several-μm level.

JP-A-2009-272041 discloses a lithium-ion secondary battery, in which minute carbon fibers adhere to particle surfaces of positive electrode active material and negative electrode active material in a mesh state. JP-A-2003-100284 discloses a negative electrode, in which inorganic compound (however, carbon is excluded) adheres to outer and inner surface of a pore of a porous carbon so as to store or emit lithium ion.

Moreover, performances of the above inventions are required to be further improved.

SUMMARY OF THE INVENTION

In view of the foregoing and other problems, the present invention relates to a negative electrode used for a nonaqueous electrolyte solution battery having excellent charge-and-discharge cycle characteristic, and a nonaqueous electrolyte solution battery having the negative electrode.

According to an example of the present invention, a negative electrode used for a nonaqueous electrolyte solution battery having nonaqueous electrolyte solution containing lithium ion includes a metal carbon composite material. The metal carbon composite material is made of a porous carbon material having cavities, and a metal material to reversibly store or emit lithium ion. The metal material is arranged on a surface of the porous carbon material including inner surfaces of the cavities. The porous carbon material has a concentration of 1-65 mass % when the metal carbon composite material is defined to have a mass of 100 mass %.

According to an example of the present invention, the metal carbon composite material of the negative electrode includes the porous carbon material and the metal material arranged on the surface of the porous carbon material including the inner surfaces of the cavities. The metal material is arranged on the surfaces of the cavities of the porous carbon material. Therefore, a stable electric conduction route can be obtained even if the metal material has a volume change in accordance with a Li alloying reaction generated at a discharging time. Especially, the metal material arranged on the inner surface of the cavity of the porous carbon material is less affected by sliding or crack, because a broken piece contacts another surface of the cavity of the porous carbon material. Thus, an electric conduction route is secured by the contact, such that influence generated by the sliding or crack can be reduced. Accordingly, when the battery repeatedly has charging and discharging, cycle characteristic can be restricted from being lowered, even if the sliding or crack is generated.

According to an example of the present invention, a cavity not having the metal material eases the volume change as a cushioning material.

According to an example of the present invention, the porous carbon material has a mass ratio of 1-65 mass % relative to the metal carbon composite material, thereby the nonaqueous electrolyte solution battery becomes excellent in charge-and-discharge cycle characteristic. If the porous carbon material has a mass ratio smaller than 1 mass % relative to the metal carbon composite material, a mass ratio of the metal material becomes too large. In this case, a sufficient contact area cannot be obtained between the metal material and the porous carbon material. That is, the contact may not be secured when sliding or crack is generated in the metal material. If the porous carbon material has a mass ratio larger than 65 mass %, the mass ratio of the metal material becomes too small. In this case, the nonaqueous electrolyte solution battery may not have a sufficient battery capacity.

According to an example of the present invention, the metal material is made of at least a kind of metal selected from elements of Si, Ge, Sn, In, Sb, and Zn, an alloy containing at least a kind of metal selected from these elements, a metal oxide containing at least a kind of metal selected from these elements, or a compound containing at least one of the metal, the alloy and the metal oxide.

These metal materials can reversibly store or emit lithium ion. The metal, the alloy, the oxide or the compound stores lithium ion in a charging time through alloying, and emits lithium ion from the alloy in a discharging time. The metal material is desirably made of a simple metal, an alloy, an oxide or a compound including at least one of Si and Sn. The metal material is favorably made of a simple metal, an alloy, an oxide or a compound of Sn.

According to an example of the present invention, the porous carbon material is made of at least one selected from a dendritic object, activated carbon, and foamed carbon.

In this case, the porous carbon material can have cavities in which the metal material is arranged. Even if the metal material supported by the porous carbon material has a crack, the contact with the porous carbon can be maintained. That is, the cycle characteristic can be restricted from being lowered. The dendritic object represents a form branched like branches of a tree.

According to an example of the present invention, the porous carbon material has a first pore having a first diameter, and a second pore having a second diameter larger than the first diameter of the first pore.

In this case, the metal material can be arranged on the inner surfaces of both of the first and second pores. The contact with the porous carbon is maintained, especially, even if the metal material supported inside of the first pore has a crack. That is, the cycle characteristic can be restricted from being lowered. The first diameter of the first pore and the second diameter of the second pore are set by a relative comparison between pores having different diameters. For example, the first pore has the first diameter equal to or smaller than 10 nm, and the second pore has the second diameter of about 10-100 nm. Further, a ratio between the first diameter and the second diameter is not limited. For example, the first diameter is desirably equal to or smaller than 30% of the second diameter.

The first pore is open from a particle of the carbon material, and the second pore is defined by a cavity generated between the particles of the carbon material. Further, the first pore is favorably filled with the metal material.

In the present invention, it is most desirable that the porous carbon material is made of the dendritic object. A pore defined on the dendritic object corresponds to the first pore having the first diameter, and a cavity defined between the dendritic objects entangling with each other corresponds to the second pore having the second diameter.

According to an example of the present invention, the porous carbon material is immersed in a solution of the metal material, and the immersed material is dried so as to produce the metal carbon composite material.

Thus, the metal material can be arranged on the surface of the cavity of the porous carbon material. Further, the metal material can be uniformly arranged on the surface of the porous carbon material since the metal material is arranged from the solution of the metal material. The solution of the metal material represents not only a solution in which the metal material is dissolved, but also a solution in which particles of the metal material are dispersed. The drying represents not only a removing of solvent so as to deposit the metal material but also a depositing of the metal material on the surface of the porous carbon material by using a reducing agent, for example.

According to an example of the present invention, the porous carbon is immersed in a solution of the metal material, and a reduction is performed in the solution so as to produce the metal carbon composite material.

Thus, the metal material can be arranged on the surface of the cavity of the porous carbon material. Further, the metal material can be uniformly arranged on the surface of the porous carbon material since the metal material is arranged from the solution of the metal material.

According to an example of the present invention, the porous carbon is immersed in a solution of the metal material, and a reduction is performed in a gas phase so as to produce the metal carbon composite material.

Thus, the metal material can be arranged on the surface of the cavity of the porous carbon material. Further, the metal material can be uniformly arranged on the surface of the porous carbon material since the metal material is arranged from the solution of the metal material.

According to an example of the present invention, the porous carbon material and the metal material are bonded with each other by applying pressure, and a heat treatment is performed to the bonded object so as to produce the metal carbon composite material.

Thus, the metal material can be arranged on the surface of the cavity of the porous carbon material. The heat treatment is performed in the pressed state at a predetermined treatment condition (temperature, time, atmosphere) at which the metal material can be melted and impregnated in the porous material. The condition is different based on a kind of the metal material.

According to an example of the present invention, the porous carbon material supports metal or metal compound having a reduction treatment so as to produce the metal carbon composite material.

Due to the reduction treatment, the metal material made of metal or metal compound can be supported on the surface of the porous carbon material.

According to an example of the present invention, the metal material supported in the metal carbon composite material is made of at least a kind of metal selected from metal elements having a melting point equal to or lower than 3500° C., an alloy containing at least a kind of metal selected from these elements, or a compound containing at least one of the metal and the alloy. The metal or the alloy forms an alloy phase with lithium at a temperature equal to or lower than 1500° C. in a phase diagram.

Figure 6:
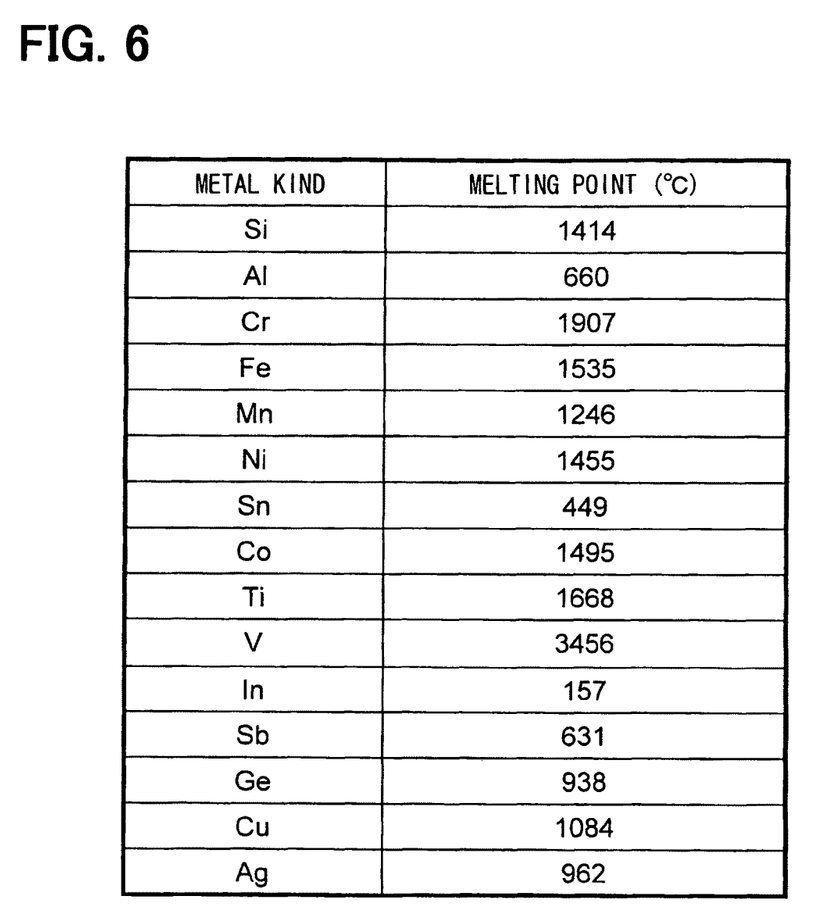
FIG. 6 is a diagram illustrating typical metal elements having a melting point equal to or lower than 3500° C.

The metal material can be supported on the surface of the porous carbon material when the melting point of the metal (alloy) defining the metal material and the temperature for the alloying are in these ranges. Metal having a melting point exceeding 3500° C., and metal or alloy having the alloying temperature higher than 1500° C. are difficult to reversibly store or emit lithium ion. Typical metal elements having the melting point equal to or lower than 3500° C. are shown in FIG. 6.

According to an example of the present invention, the metal or the metal oxide supported in the metal carbon composite material is selected from Sn, Si, Ag—Sn alloy, Sn—Ag—Sb alloy, Cu—Sn alloy, Ag—Ge alloy, Cu—Ge alloy, Sn oxide, and Si oxide.

Thus, even if the nonaqueous electrolyte solution battery repeatedly has charging and discharging, the cycle characteristic can be much restricted from being lowered.

According to an example of the present invention, the porous carbon material has a tap density equal to or lower than 0.2 g/cm$^3$.

Thus, a large amount of the metal material can be arranged on the surface of the cavity of the porous carbon material. Specifically, the tap density represents a mass of the porous carbon material occupied in 1 cm$^3$ (cc). The porous carbon material becomes dense (the cavity is reduced) as the tap density is increased. That is, the cavity of the porous carbon material is decreased as the tap density is increased. An amount of the metal material arranged on the surface is reduced as the cavity of the porous carbon material is decreased. If the tap density becomes larger than 0.2 g/cm$^3$, a ratio of the porous carbon material becomes too large. In this case, the amount of the metal material arranged on the surface becomes insufficient. The tap density represents a density when a predetermined vibration (tapping) is provided in order to raise a pack density.

According to an example of the present invention, the porous carbon material has a pore volume equal to or larger 1.5 cm$^3$/g when the pore volume is measured by using BJH method. A large amount of the metal material can be arranged on the surface of the porous carbon material when the pore volume is equal to or larger 1.5 cm$^3$/g(=1.5 cc/g). An amount of the cavity for arranging the metal material becomes insufficient when the pore volume is smaller than 1.5 cm$^3$/g.

According to an example of the present invention, the porous carbon material has an average pore diameter equal to or smaller than 7 nm when the average pore diameter is measured by using BJH method.

Thus, the contact between the porous carbon material and the metal material arranged on the surface of the cavity can be maintained. If the average pore diameter exceeds 7 nm, the contact cannot be maintained when a particle of the metal material arranged in the cavity (pore) of the porous carbon material has a crack. That is, when the metal material has a crack, an amount of metal unable to contact with the porous carbon material is increased as the average pore diameter of the porous carbon material becomes large. In this case, a capacity of the nonaqueous electrolyte solution battery becomes insufficient.

According to an example of the present invention, the nonaqueous electrolyte solution battery is characterized by being a lithium ion battery.

The negative electrode used for the nonaqueous electrolyte solution battery is made of the metal material able to reversibly store or emit lithium ion. Therefore, when the negative electrode is used for the lithium ion battery having electrolyte solution containing lithium ion, the cycle characteristic can be restricted from being lowered even if charging and discharging are repeated.

According to an example of the present invention, the nonaqueous electrolyte solution battery is characterized by having the above negative electrode, a positive electrode, and a nonaqueous electrolyte solution containing lithium ion.

Therefore, the cycle characteristic can be restricted from being lowered, even if charging and discharging are repeated.

DETAILED DESCRIPTION OF PREFERRED EMBODIMENT

A negative electrode used for a nonaqueous electrolyte solution battery and a nonaqueous electrolyte solution battery will be described below according to the present invention.
(Negative Electrode for Nonaqueous Electrolyte Solution Battery)

A negative electrode of the present invention is used for a nonaquelous electrolyte solution battery having nonaqueous electrolyte solution containing lithium ion. The negative electrode has a metal carbon composite material made of a porous carbon material and a metal material. The porous carbon material is made of a carbon-based material, and has cavities. The metal material is made of metal able to reversibly store or emit lithium ion. The metal material is arranged on a surface of the porous carbon material. The surface of the porous carbon material includes inner surfaces of the cavities.

The metal carbon composite material of the negative electrode favorably has a particle diameter ranged in 0.5-100 μm. The particle diameter may be ranged in 0.5-50 μm. If a diameter of a secondary particle is set too small, charge-and-discharge efficiency and capacity are lowered, because a remarkable sub-reaction with electrolyte solution of the nonaqueous electrolyte solution battery is generated. If the diameter of the secondary particle is set too large, a rate characteristic is lowered, because it becomes difficult for the lithium ion to have diffusion into an inside of crystal structure.

The negative electrode of the present invention may have a similar construction as a conventional nonaqueous electrolyte solution battery, except for having the above-mentioned metal carbon composite material. That is, the negative electrode of the present invention may be produced by applying a coating solution to a surface of a current collector, and by drying the coating solution. The coating solution is produced by mixing the metal carbon composite material, a conducting agent, and a binding agent so as to be suspended in a suitable solvent.

The metal carbon composite material corresponds to an active material. Further, other well-known negative electrode active material may be included in the negative electrode of the present invention. Specifically, a graphite may be included, for example, so as to increase the capacity.

The conducting agent may be made of a carbon material, metal powder or conductive polymer, for example. The carbon material may be made of acetylene black, ketjen black or carbon black, from a viewpoint of conductivity and stability.

The binding agent may be made of polytetrafluoroethylene (PTFE), polyvinylidene fluoride (PVDF), fluoro-resin copolymer (4 fluoridation ethylene and 6 fluoridation propylene copolymer), SBR, acrylic rubber, fluoric rubber, polyvinyl alcohol (PVA), styrene maleic acid resin, polyacrylic acid salt, or carboxyl methyl cellulose (CMC), for example.

The solvent may be made of organic solvent such as N-methyl-2-pyrolidone (NMP), or water.

A weight ratio among the negative electrode active material, the conducting agent, and the binding agent is changed in accordance with characteristics required for the negative electrode. For example, the negative electrode active material has 60-98 mass %, the conducting agent has 0-20 mass %, and the binding agent has 2-10 mass %.

The current collector may be made of conventional one such as foil or mesh made of copper, stainless steel, titanium or nickel.

(Nonaqueous Electrolyte Solution Battery)

The nonaqueous electrolyte solution battery of the present invention may have a similar construction as a conventional nonaqueous electrolyte solution battery, except for using the above-mentioned metal carbon composite material as the negative electrode active material. That is, the nonaqueous electrolyte solution battery has the above-mentioned negative electrode, a positive electrode, nonaqueous electrolyte solution containing lithium ion, and a separator arranged between the negative electrode and the positive electrode.

The positive electrode is produced by applying a slurry to one side or both sides of the current collector, and by drying the slurry. The slurry is produced by mixing a positive electrode active material, a conducting agent, and a binding agent so as to be suspended in a suitable solvent.

The positive electrode active material may be made of oxides, sulfides, lithium-contained oxides or conductive polymer. For example, the positive electrode active material may be made of $MnO_2$, $TiS_2$, $TiS_3$, $MoS_3$, $FeS_2$, $Li_{1-x}MnO_2$, $Li_{1-x}Mn_2O_4$, $Li_{1-x}CoO_2$, $Li_{1-x}NiO_2$, $LiV_2O_3$, $V_2O_5$, polyaniline, polyparaphenylene, polyphenylene sulphide, polyphenylene oxide, poly thiophene, polypyrrole, or their derivatives or stable radical compound. A value of x indicates the number of 0-1. Alternatively, Li, Mg, Al or transition metal such as Co, Ti, Nb or Cr may be added or replaced. The lithium-metal composite oxide may be solely used, or two or more kinds of the oxides may be used through a mixing. The lithium-metal composite oxide may be one or more sorts among lithium manganese contained composite oxide, lithium nickel contained composite oxide, and lithium cobalt contained composite oxide, each of which having layer structure or spinel structure.

The conducting material of the positive electrode may be made of graphite particles, carbon black such as acetylene black or ketene black, carbon nano-fiber, or amorphous carbon particles such as needle coke. However, the conducting material of the positive electrode is not limited to these.

The binding agent may be made of PVDF, ethylene-propylene-diene copolymer (EPDM), SBR, acrylonitrile-butadiene rubber (NBR), or fluororubber. However, the binding agent is not limited to these.

The solvent used for dispersing the positive electrode active material is usually made of organic solvent dissolving the binding agent. For example, the solvent may be made of NMP, dimethylformamide, dimethylacetamide, methyl ethyl ketone, cyclohexanone, methyl acetate, methyl acrylate, diethyltriamine, N—N-dimethylaminopropylamine, ethylene oxide, or tetrahydrofuran. However, the solvent is not limited to these. Alternatively, the active material may have a slurry state by adding dispersant, thickener and PTFE, for example, to water.

The nonaqueous electrolyte solution may have a similar composition as a conventional nonaqueous electrolyte solution, except for containing lithium ion. That is, a well-known nonaqueous electrolyte solution for a lithium ion battery may be used for the nonaqueous electrolyte solution of the present invention. The nonaqueous electrolyte solution may be made by dissolving nonaqueous electrolyte in organic solvent.

The organic solvent is not limited, and is made of organic solvent usually used for electrolyte solution of a lithium secondary battery. For example, carbonate, halogenated hydrocarbon, ether, ketone, nitrile, lactone or oxolan compound may be used as the organic solvent. In particular, propylene carbonate, ethylene carbonate, 1,2-dimethoxyethane, dimethyl carbonate, diethyl carbonate, ethyl methyl carbonate, vinylene carbonate or those mixed solvent is suitable as the organic solvent. One or more sorts of nonaqueous solvents selected from a group consisted of carbonate and ether are favorably used as the organic solvent. In this case, electrolyte has excellent solubility, dielectric constant, and viscosity, such that the battery has high charge-and-discharge efficiency.

The nonaqueous electrolyte may be made of at least one of inorganic salt selected from $LiPF_6$, $LiBF_4$, $LiClO_4$, and $LiAsF_6$, derivative of the inorganic salt, organic salt selected from $LiSO_3CF_3$, $LiC(SO_3CF_3)_3$, $LiN(SO_2CF_3)_2$, $LiN(SO_2C_2F_6)_2$, $LiN(SO_2CF_3)(SO_2C_4F_9)$, and derivative of the organic salt. However, the nonaqueous electrolyte is not limited to these. The nonaqueous electrolyte can make a performance of the battery more excellent. Further, the performance can be maintained to be high in a temperature range other than a room temperature. A concentration of the electrolyte is not limited in particular. The concentration is suitably set in consideration of the kind of the electrolyte and the organic solvent based on its object for using.

The separator electrically insulates the positive electrode and the negative electrode from each other, and holds the electrolyte solution. For example, the separator is made of a porous synthetic resin film, especially, a porous membrane made of polyolefine polymer (polyethylene, polypropylene). The separator is much larger than the positive electrode and the negative electrode in order to secure the insulation between the positive electrode and the negative electrode.

The nonaqueous electrolyte solution battery of the present invention may include other element, if necessary, in addition to the above-mentioned elements. A shape of the battery is not limited. For example, the battery may have a coin, cylinder or square shape.

The negative electrode active material, the negative electrode (used for lithium ion secondary battery) and the nonaqueous electrolyte battery (corresponding to lithium ion secondary battery) are produced in following embodiments.

First Embodiment

A porous carbon material is manufactured by using a method disclosed in CARBON47 (2009) 306-312.

Specifically, silver nitrate (I) is dissolved in ammonia water solution. Ultrasonic vibration having 20 kHz is given while acetylene is introduced with a flowing speed of 50 ml/min. Thereby, white-yellow colored solid having a dendritic shape is produced. The solid is heated so as to separate silver, thereby a porous carbon material made of a mesoporous carbon nano dendritic object (MCND) is manufactured.

Figure 1:
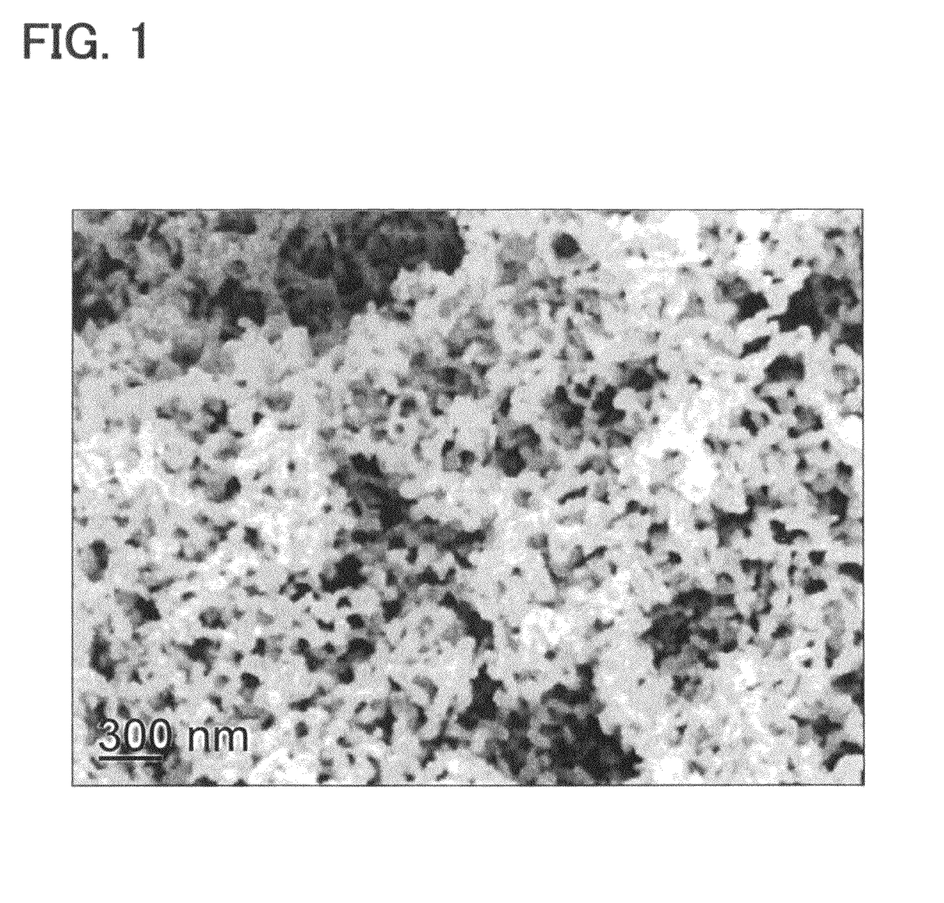
FIG. 1 is a TEM photograph of a porous carbon material (MCND) according to a first embodiment.
Figure 2:
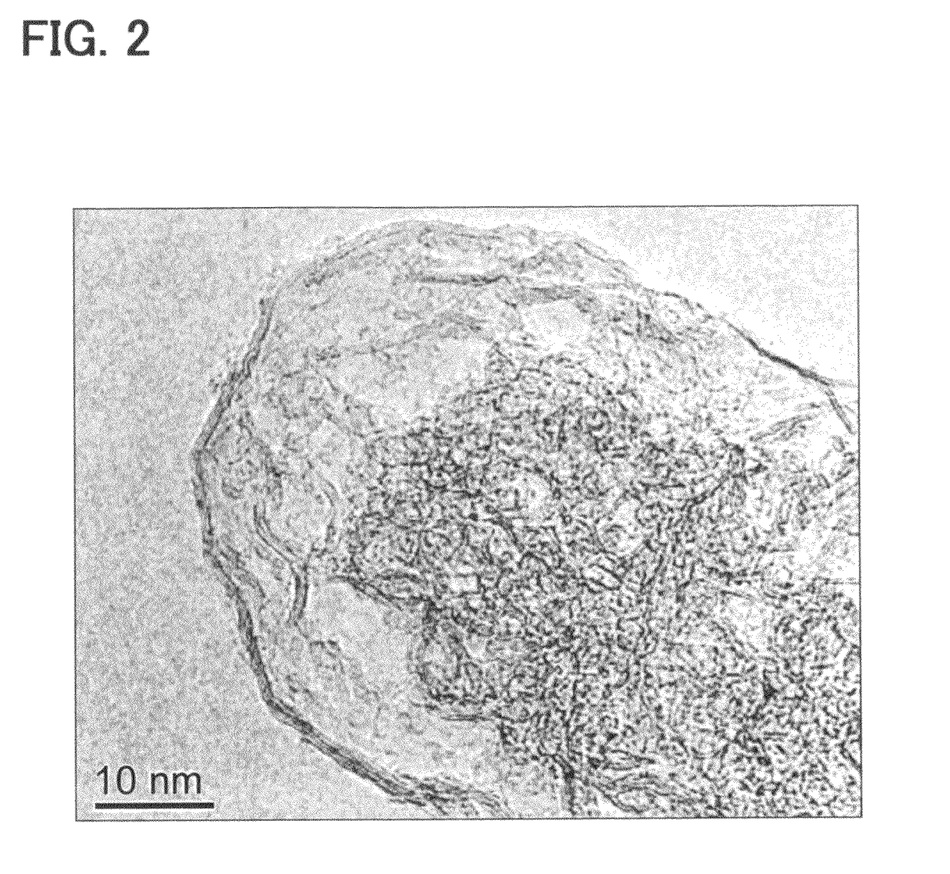
FIG. 2 is a TEM photograph of a porous carbon material (MCND) according to a first embodiment.

A micrograph (TEM photograph) of the manufactured MCND is taken and observed. The TEM photograph is shown in FIGS. 1 and 2. The MCND itself has pores, and cavities having dimension larger than dimension of the pore are defined between the MCNDs.

The manufactured porous carbon material has a tap density of $0.12$ g/cm$^3$. An average pore size is measured as $4.1$ nm, and a pore volume is measured as $1.84$ cm$^3$/g, through BJH method.

Pore distribution and pore volume are measured with following conditions by using "BELSORP 36 high-accuracy full automatic gas adsorption equipment" manufactured by BEL Japan, Inc. Adsorption gas: N2, Dead volume: He, Adsorption temperature: liquid nitrogen temperature (77K), Measurement pretreatment: 150° C. vacuum deairing, Measurement mode: isothermal adsorption and desorption, Measuring range: relative pressure (P/P0)=0.00-0.99, Balancing time: 180 sec each balanced relative pressure, Analysis method: BJH method, Pore diameter range: 2 nm-40 nm. The pore volume is calculated by a liquid conversion of adsorption amount adjacent to relative pressure of 1.0 in a constant-temperature line.

Next, tin chloride dihydrate of 3.8 g is dissolved in pure water, and further, porous carbon material (MCND) of 0.04 g is dispersed. Sufficient agitation is performed. Then, 20% hydrazine water solution of 10 ml is added as a reducing agent, thereby tin is reduced. Filtration, washing and desiccation are performed, such that a metal carbon composite material is produced. At this time, Sn compound is arranged on a surface of the pore and the cavity of the porous carbon material. When the manufactured metal carbon composite material is defined to have a mass of 100%, the porous carbon material has a mass percentage of 2% (mass %).

Figure 3:
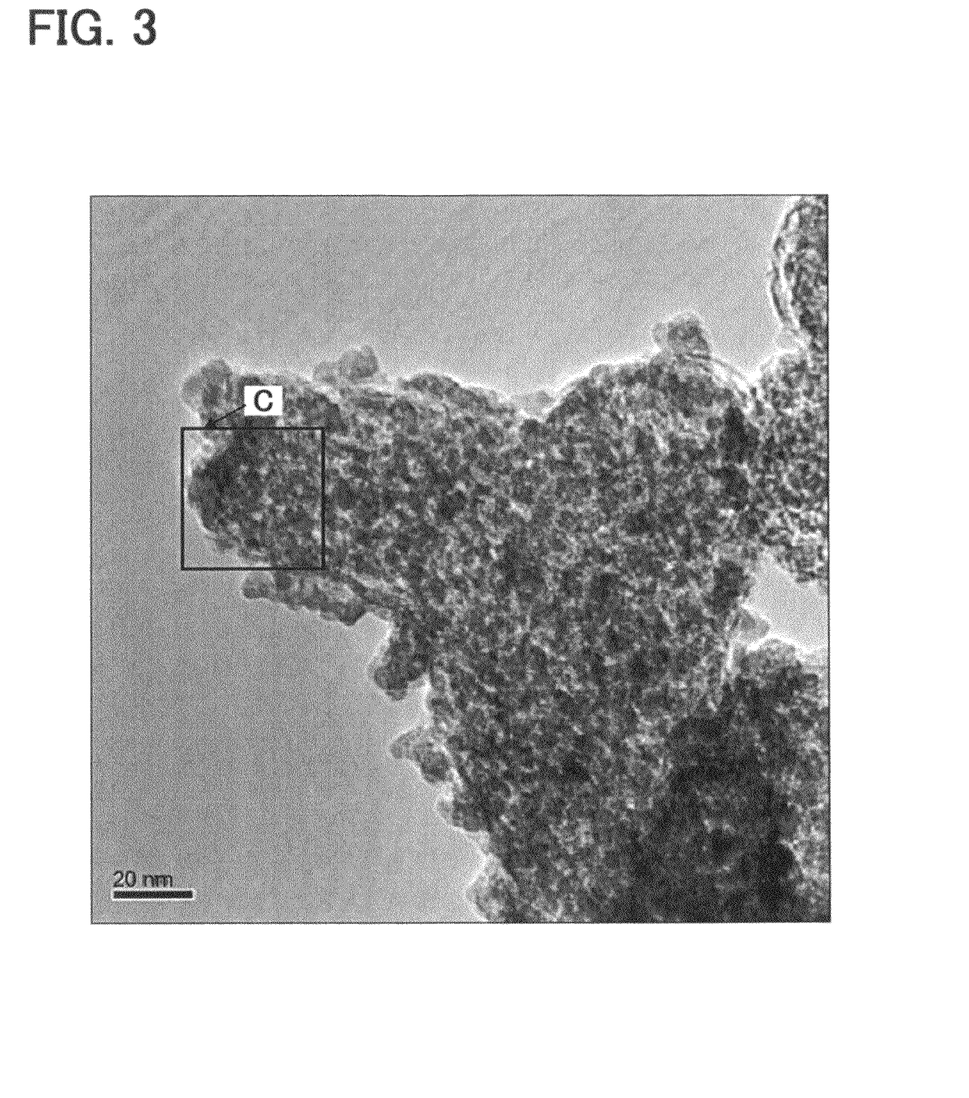
FIG. 3 is a TEM photograph of a metal carbon composite material according to a first embodiment.
Figure 4:
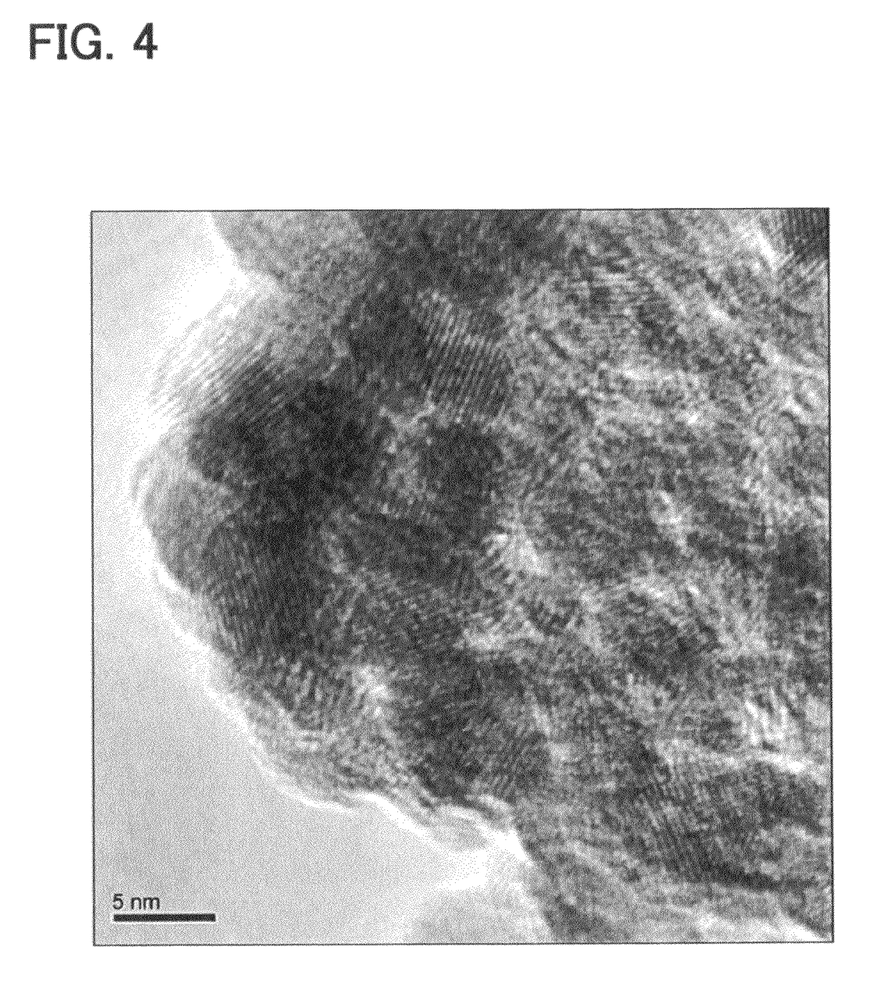
FIG. 4 is a TEM photograph of a metal carbon composite material according to a first embodiment.

A micrograph (TEM photograph) of the manufactured metal carbon composite material is taken and observed. The TEM photograph is shown in FIGS. 3 and 4. The photograph of FIG. 4 is an enlarged portion indicated by C of FIG. 3. Sn compound is confirmed to be arranged in the pore of MCND and the cavity located between the MCNDs.

Metal carbon composite material of 85 mass % (negative electrode active material) having average particle diameter of 10 μm, ketjen black of 5 mass % (conducting material) and PVDF of 10 mass % (binder) are prepared, and dispersed in NMP so as to have a slurry state. After the slurry is applied to an electrolytic copper foil having a thickness: 18 μm so as to have a composite mass of 5.0 mg/φ14 mm, the composite material is dried, and press molding is performed. Thus, a negative electrode board can be produced. The negative electrode board is patterned with a circular punch having φ14 mm, and vacuum drying is performed at 120° C. for 6 hours. Thus, a negative electrode can be produced.

Thereby, the negative electrode used for a nonaqueous electrolyte battery is manufactured according to the first embodiment.

The manufactured negative electrode, metal lithium corresponding to a positive electrode (counter electrode), and electrolyte solution are used for producing a nonaqueous electrolyte battery (CR2025 type) having a coin shape. The electrolyte solution is produced by dissolving LiPF6 in a mixed solvent mixing ethylene carbonate (EC) of 30 vol % and diethyl carbonate (DEC) of 70 vol %, so as to have a concentration of 1 mol/L. The production is performed through an assembling conducted in a dry box. In the battery assembling of this embodiment, the positive electrode and the negative electrode are layered through the separator made of polypropylene, and a case of the battery is tightly closed in a state that the layered electrodes and the electrolyte solution are sealed in the case.

Second Embodiment

A negative electrode and a battery are produced similarly as the first embodiment except for changing a ratio of the porous carbon material to the metal carbon composite material. The ratio is set as 1 mass % in a second embodiment. According to the second embodiment, the metal carbon composite material has an average particle diameter of 17 μm. The tap density, the pore volume and the average pore diameter of the porous carbon material are approximately the same as the first embodiment.

Third Embodiment

A negative electrode and a battery are produced similarly as the first embodiment except for changing a ratio of the porous carbon material to the metal carbon composite material. The ratio is set as 10 mass % in a third embodiment. According to the third embodiment, the metal carbon composite material has an average particle diameter of 15 μm. The tap density, the pore volume and the average pore diameter of the porous carbon material are approximately the same as the first embodiment.

Fourth Embodiment

A negative electrode and a battery are produced similarly as the first embodiment except for changing a kind of the porous carbon material. The porous carbon material used in a fourth embodiment is activated carbon, trade name: GLC-P, produced by KURARAY CHEMICAL CO., LTD. The activated carbon has a tap density of $0.12$ g/cm$^3$, an average pore diameter of $5.1$ nm and a pore volume of $1.65$ cm$^3$/g based on BJH method. According to the fourth embodiment, the metal carbon composite material has an average particle diameter of 20 μm.

Fifth Embodiment

A negative electrode and a battery are produced similarly as the first embodiment except for changing a kind of the porous carbon material. The porous carbon material used in a fifth embodiment is activated carbon GLC—H—P produced by KURARAY CHEMICAL CO., LTD. The activated carbon has a tap density of $0.2$ g/cm$^3$, an average pore diameter of $7.0$ nm and a pore volume of $2.13$ cm$^3$/g based on BJH method. According to the fifth embodiment, the metal carbon composite material has an average particle diameter of 20 μm.

Sixth Embodiment

A negative electrode and a battery are produced similarly as the first embodiment except for changing a kind of the porous carbon material. The porous carbon material used in a sixth embodiment is activated carbon SA1000 (cleaned product) produced by FUTAMURA CHEMICAL CO., LTD. The activated carbon has a tap density of 0.15 g/cm$^3$, an average pore diameter of 4.2 nm and a pore volume of 1.56 cm$^3$/g based on BJH method. According to the sixth embodiment, the metal carbon composite material has an average particle diameter of 8 μm.

Seventh Embodiment

A negative electrode and a battery are produced similarly as the first embodiment except for using a following metal carbon composite material as a negative electrode active material. According to a seventh embodiment, the metal carbon composite material has an average particle diameter of 15 μm. The tap density, the pore volume and the average pore diameter of the porous carbon material are approximately the same as the first embodiment.

A synthetic method of the metal carbon composite material of this embodiment will be specifically described. Tin chloride dihydrate of 20 g is dissolved in tetrahydrofuran (THF) of 100 ml, and, further, porous carbon materials (MCND) of 1.00 g used in the first embodiment is dispersed. Sufficient agitation is performed. Then, re-flux, evaporation of THF and filtration are performed. After the filtration, Tin is reduced in hydrogen gas batch type flow. Thus, a metal carbon composite material is produced, in which Sn simple metal or Sn compound is arranged on the surface of the pore and the cavity of the porous carbon material. When the manufactured metal carbon composite material is defined to have a mass of 100%, the porous carbon material has a mass percentage of 63.1% (mass %).

Eighth Embodiment

A negative electrode and a battery are produced similarly as the first embodiment except for using a following metal carbon composite material as a negative electrode active material. According to an eighth embodiment, the metal carbon composite material has an average particle diameter of 15 μm. The tap density, the pore volume and the average pore diameter of the porous carbon material are approximately the same as the first embodiment.

A synthetic method of the metal carbon composite material of this embodiment will be specifically described. Tin chloride dihydrate of 20 g is dissolved in THF of 100 ml, and, further, porous carbon material (MCND) of 1.00 g used in the first embodiment is dispersed. Sufficient agitation is performed. Then, re-flux, evaporation of THF and filtration are performed. After the filtration, Tin is reduced in hydrogen gas continuous flow. Thus, a metal carbon composite material is produced, in which Sn simple metal is arranged on the surface of the pore and the cavity of the porous carbon material. When the manufactured metal carbon composite material is defined to have a mass of 100%, the porous carbon material has a mass percentage of 34.3% (mass %).

Ninth Embodiment

A negative electrode and a battery are produced similarly as the first embodiment except for using a following metal carbon composite material as a negative electrode active material. According to a ninth embodiment, the metal carbon composite material has an average particle diameter of 15 μm. The tap density, the pore volume and the average pore diameter of the porous carbon material are approximately the same as the first embodiment.

A synthetic method of the metal carbon composite material of this embodiment will be specifically described. MCND and Sn nano-particles are mixed, and the mixture is rubbed by using an automatic mortar grinder. Next, its temperature is rapidly raised up to 350° C. in a vacuum state, thereby Sn is fixed inside of the pore through fusion and osmosis. Thus, a metal carbon composite material is produced, in which Sn simple metal or Sn compound is arranged on the surface of the pore and the cavity of the porous carbon material. When the manufactured metal carbon composite material is defined to have a mass of 100%, the porous, carbon material has a mass percentage of 9% (mass %).

Figure 5:
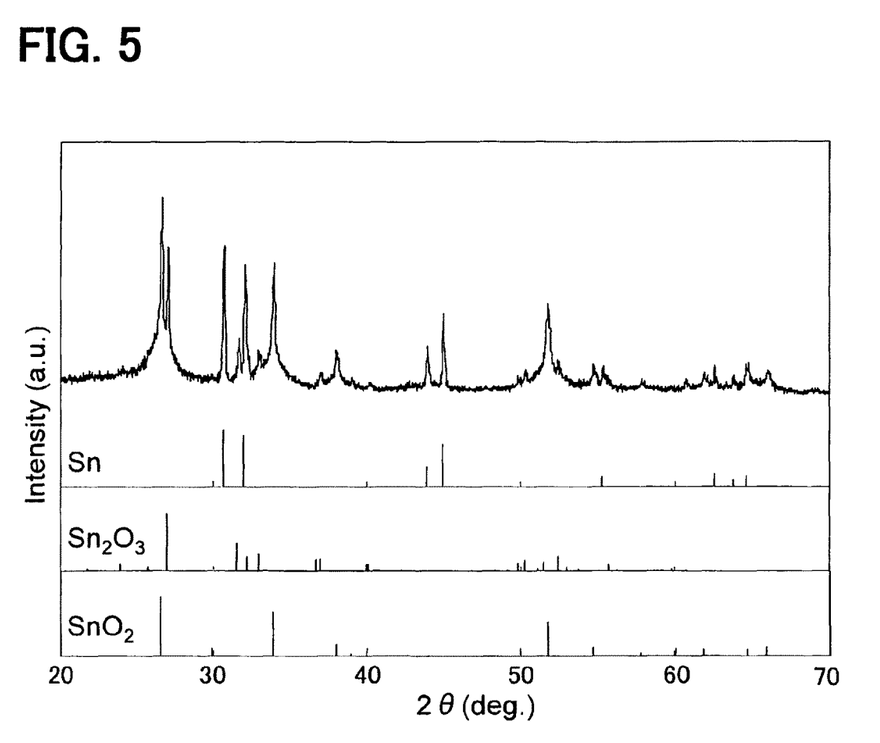
FIG. 5 is a graph illustrating measurement result of XRD of a metal carbon composite material according to a ninth embodiment.

Structure analysis of the manufactured metal carbon composite material is conducted with X ray diffraction method. XRD pattern is shown in FIG. 5, in which it is confirmed that Sn metal and Sn oxide such as $Sn_2O_3$ and $SnO_2$ are supported in the manufactured metal carbon composite material.

A melting point of Sn metal is 449° F., and a temperature for forming an alloy phase with lithium is 179-783° C.

Tenth Embodiment

A negative electrode and a battery are produced similarly as the first embodiment except for using a following metal carbon composite material as a negative electrode active material. According to a tenth embodiment, the metal carbon composite material has an average particle diameter of 15 μm. The tap density, the pore volume and the average pore diameter of the porous carbon material are approximately the same as the first embodiment.

A synthetic method of the metal carbon composite material of this embodiment will be specifically described. MCND of 1 g and Si nano-particles of 1 g are mixed, and the mixture is rubbed in the porous carbon material by using the automatic mortar grinder. Next, an annealing is performed at 1460° C. for 30 minutes so as to fix Si inside of the pore. Thus, a metal carbon composite material is produced, in which Si simple metal or Si compound is arranged on the surface of the pore and the cavity of the porous carbon material. When the manufactured metal carbon composite material is defined to have a mass of 100%, the porous carbon material has a mass percentage of 50.0% (mass %).

Here, the metal carbon material is analyzed similarly to the ninth embodiment, such that it is confirmed that Si metal and Si oxide such as $SiO_2$ are supported in the metal carbon composite material.

A melting point of Si metal is 1414° C., and a temperature for forming an alloy phase with lithium is 180.5-1414° C.

Eleventh Embodiment

A negative electrode and a battery are produced similarly as the first embodiment except for using a following metal carbon composite material as a negative electrode active material. According to an eleventh embodiment, the metal carbon composite material has an average particle diameter of 15 μm. The tap density, the pore volume and the average pore diameter of the porous carbon material are approximately the same as the first embodiment.

A synthetic method of the metal carbon composite material of this embodiment will be specifically described. MCND, Sn nano-particles, and Cu nano-particles are mixed, and the mixture is rubbed in the porous carbon material by using the automatic mortar grinder. Next, an annealing is performed so as to fix $Cu_6Sn_5$ and $Cu_3Sn$ inside of the pore. Thus, a metal carbon composite material is produced, in which Cu—Sn alloy is arranged on the surface of the pore and the cavity of the porous carbon material. When the manufactured metal carbon composite material is defined to have a mass of 100%, the porous carbon material has a mass percentage of 9.0% (mass %).

A melting point of Cu metal is 1084° C.

Twelfth Embodiment

A negative electrode and a battery are produced similarly as the first embodiment except for using a following metal carbon composite material as a negative electrode active material. According to a twelfth embodiment, the metal carbon composite material has an average particle diameter of 15 µm. The tap density, the pore volume and the average pore diameter of the porous carbon material are approximately the same as the first embodiment.

A synthetic method of the metal carbon composite material of this embodiment will be specifically described. MCND, Sn nano-particles, and Ag nano-particles are mixed, and the mixture is rubbed in the porous carbon material by using the automatic mortar grinder. Next, an annealing is performed so as to fix $Ag_3Sn$ inside of the pore. Thus, a metal carbon composite material is produced, in which Ag—Sn alloy is arranged on the surface of the pore and the cavity of the porous carbon material. When the manufactured metal carbon composite material is defined to have a mass of 100%, the porous carbon material has a mass percentage of 10.0% (mass %).

A melting point of Ag metal is 962° C.

Thirteenth Embodiment

A negative electrode and a battery are produced similarly as the first embodiment except for using a following metal carbon composite material as a negative electrode active material. According to a thirteenth embodiment, the metal carbon composite material has an average particle diameter of 15 µm. The tap density, the pore volume and the average pore diameter of the porous carbon material are approximately the same as the first embodiment.

A synthetic method of the metal carbon composite material of this embodiment will be specifically described. MCND, Sn nano-particles, Ag nano-particles, and Sb particles are mixed, and the mixture is rubbed in the porous carbon material by using the automatic mortar grinder. Next, an annealing is performed so as to fix SnAgSb inside of the pore. Thus, a metal carbon composite material is produced, in which Sn—Ag—Sb alloy is arranged on the surface of the pore and the cavity of the porous carbon material. When the manufactured metal carbon composite material is defined to have a mass of 100%, the porous carbon material has a mass percentage of 10.0% (mass %).

A melting point of Sb metal is 631° C., and a temperature for forming an alloy phase with lithium is 180.6-1400° C.

Fourteenth Embodiment

A negative electrode and a battery are produced similarly as the first embodiment except for using a following metal carbon composite material as a negative electrode active material. According to a fourteenth embodiment, the metal carbon composite material has an average particle diameter of 15 µm. The tap density, the pore volume and the average pore diameter of the porous carbon material are approximately the same as the first embodiment.

A synthetic method of the metal carbon composite material of this embodiment will be specifically described. MCND, Ag nano-particles, and Ge particles are mixed, and the mixture is rubbed in the porous carbon material by using the automatic mortar grinder. Next, an annealing is performed so as to fix $Ag_3Ge$ inside of the pore. Thus, a metal carbon composite material is produced, in which Ag—Ge alloy is arranged on the surface of the pore and the cavity of the porous carbon material. When the manufactured metal carbon composite material is defined to have a mass of 100%, the porous carbon material has a mass percentage of 10.0% (mass %).

A melting point of Ge metal is 938° C., and a temperature for forming an alloy phase with lithium is 180.6-938.3° C.

Fifteenth Embodiment

A negative electrode and a battery are produced similarly as the first embodiment except for using a following metal carbon composite material as a negative electrode active material. According to a fifteenth embodiment, the metal carbon composite material has an average particle diameter of 15 µm. The tap density, the pore volume and the average pore diameter of the porous carbon material are approximately the same as the first embodiment.

A synthetic method of the metal carbon composite material of this embodiment will be specifically described. MCND, Cu nano-particles, and Ge particles are mixed, and the mixture is rubbed in the porous carbon material by using the automatic mortar grinder. Next, an annealing is performed so as to fix $Cu_5Ge_2$ inside of the pore. Thus, a metal carbon composite material is produced, in which Cu—Ge alloy is arranged on the surface of the pore and the cavity of the porous carbon material. When the manufactured metal carbon composite material is defined to have a mass of 100%, the porous carbon material has a mass percentage of 10.0% (mass %).

Comparison Example 1

A negative electrode and a battery are produced similarly as the first embodiment except for using Sn powder as a negative electrode active material.

(Evaluation)

Figure 7:
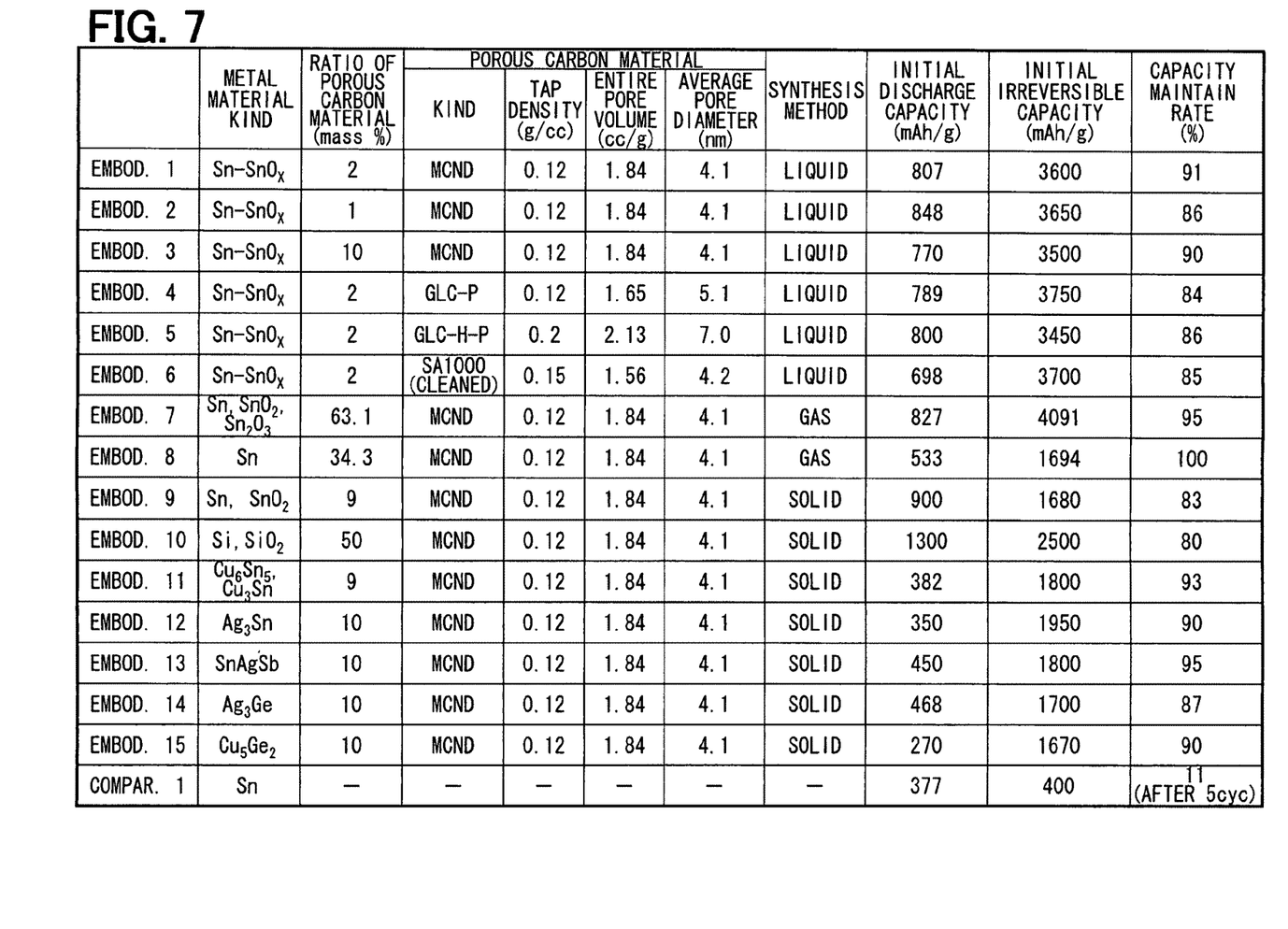
FIG. 7 is a diagram illustrating evaluation results of embodiments 1-15 and comparison example 1.

Evaluations are performed relative to the negative electrode and the battery for each of the embodiments and the comparison example. An initial discharge capacity of the battery is measured. Further, a maintain rate of discharge capacity (capacity maintain rate) is measured after repeating charging and discharging. The evaluation results are shown in FIG. 7.

For the measurement of the initial discharge capacity, charging is performed up to 0.01V with a constant charging current 0.10 mA/cm$^2$, and discharging is performed up to 1.0V with a constant discharging current 0.10 mA/cm$^2$. A discharge capacity at this time is defined as the initial discharge capacity.

For the measurement of the capacity maintain rate, charging is performed up to 0.01V with a constant charging current 0.385 mA/cm$^2$ after the initial charging and discharging, and discharging is performed up to 1.0V with a constant discharging current 0.385 mA/cm$^2$. A discharge capacity at this time is defined as a first cycle discharge capacity. Then, charging and discharging are repeatedly performed 30 times. The discharge capacity maintain rate (%) is calculated by using a thirtieth cycle discharge capacity and the first cycle discharge capacity based on the following formula. The charging and discharging and the measurement of the discharge capacity are performed in 25° C. atmosphere.

Capacity maintain rate (%)=[(thirtieth cycle discharge capacity)/(first cycle discharge capacity)]×100

As shown in FIG. 7, in the comparison example 1 using the Sn particle directly as the negative electrode active material, electric isolation is generated in the negative electrode active material by crack or sliding in accordance with a volume change at the initial charging and discharging time, such that the capacity is low. Further, if charging and discharging is repeated in the comparison example 1, more electric isolation is proceeded, such that the capacity is greatly lowered in several cycles. Because the lowering of the discharge capacity generated by the repeating of the charging and discharging is remarkable in the comparison example 1, the discharge capacity maintain rate shown in FIG. 7 is a value measured after 5 cycles are performed.

In contrast, according to each of the embodiments in which the metal carbon composite material is used as the negative electrode active material, the initial capacity and the cycle characteristic are improved greatly compared with the comparison example. The metal material is charged in the pore and the cavity of the porous carbon material of the composite material. Carbon corresponding to the porous carbon material has a large contact area with the metal material. Therefore, a conducting route can be secured inside of the active material. Further, the metal material in nano level state is charged in the pore and the cavity of the porous carbon material having a diameter equal to or smaller than 10 nm. Thus, influence generated by the sliding or crack is difficult to be received, in each of the embodiments.

Moreover, sufficient effect can be obtained when the ratio (weight ratio) of the porous carbon material to the metal carbon composite material is equal to or larger than 0.01.

The initial capacity and the cycle characteristic are improved greatly compared with the comparison example in each of the embodiments, although the producing method of the metal carbon composite material is different among the embodiments. That is, in spite of the producing method, the metal carbon composite material can provide excellent effects when the metal material is charged in the pore and the cavity of the porous carbon material.

Thus, a negative electrode excellent in the cycle characteristic can be obtained by using particles of the metal carbon composite material as the negative electrode active material, in which the metal material to store or emit lithium ion is charged in the pore and the cavity of the porous carbon material.

What is claimed is:

1. A negative electrode used for a nonaqueous electrolyte solution battery having nonaqueous electrolyte solution containing lithium ion, the negative electrode comprising:
a metal carbon composite material including a porous carbon material and a metal material, the porous carbon material being made of carbon material having cavities, the metal material being made of metal to reversibly store or emit lithium ion, the metal material being arranged on a surface of the porous carbon material including inner surfaces of the cavities, wherein
the porous carbon material has a concentration of 1-65 mass % when the metal carbon composite material is defined to have a mass of 100 mass %,
the porous carbon material comprises a plurality of dendritic objects having a three-dimensional mesh structure,
the porous carbon material has a first pore having a first diameter and a second pore having a second diameter larger than the first diameter of the first pore,
the first pore is a pore defined on the dendritic object and the second pore is a cavity defined between the plurality of dendritic objects entangling with each other,
the first diameter is smaller than or equal to 10 nm,
the second diameter is in a range between 10 nm and 100 nm,
the metal material is arranged on an inner surface of the first pore and an inner surface of the second pore, and
the metal carbon composite material has a particle shape having a diameter in a range between 0.5 μm and 100 μm.

2. The negative electrode according to claim 1, wherein the metal material is made of at least a kind of metal selected from elements of Si, Ge, Sn, In, Sb, and Zn, an alloy containing at least a kind of metal selected from the elements, a metal oxide containing at least a kind of metal selected from the elements, or a compound containing at least one of the metal, the alloy and the metal oxide.

3. The negative electrode according to claim 1, wherein the metal material supported in the metal carbon composite material is made of at least a kind of metal selected from metal elements having melting point equal to or lower than 3500° C., an alloy containing at least a kind of metal selected from the metal elements, or a compound containing at least one of the metal and the alloy, and
the metal or the alloy forms an alloy phase with lithium at a temperature equal to or lower than 1500° C. in a phase diagram.

4. The negative electrode according to claim 1, wherein the metal material supported in the metal carbon composite material is selected from Sn, Si, Ag—Sn alloy, Sn—Ag—Sb alloy, Cu—Sn alloy, Ag—Ge alloy, Cu—Ge alloy, Sn oxide and Si oxide.

5. The negative electrode according to claim 1, wherein the porous carbon material has a tap density equal to or lower than 0.2 g/cm$^3$.

6. The negative electrode according to claim 1, wherein the porous carbon material has a pore volume equal to or larger than 1.5 cm$^3$/g when the pore volume is measured by using a BJH method.

7. The negative electrode according to claim 1, wherein the porous carbon material has an average pore diameter equal to or smaller than 7 nm when the average pore diameter is measured by using a BJH method.

8. The negative electrode according to claim 1, wherein the nonaqueous electrolyte solution battery is a lithium ion battery.

9. A nonaqueous electrolyte solution battery comprising the negative electrode according to claim 1, a positive electrode and a nonaqueous electrolyte solution containing lithium ion.

* * * * *